United States Patent [19]

Dorsman

[11] Patent Number: 4,664,523

[45] Date of Patent: May 12, 1987

[54] APPARATUS FOR INCREASING THE RESOLUTION OF A LASER GYROSCOPE

[75] Inventor: Adrian K. Dorsman, Bellflower, Calif.

[73] Assignee: Rockwell International Corporation, El Segundo, Calif.

[21] Appl. No.: 457,845

[22] Filed: Jan. 14, 1983

[51] Int. Cl.⁴ .................. G01B 9/02; H01S 3/083; G01R 25/00

[52] U.S. Cl. .................. 356/350; 307/514; 307/515; 307/516; 307/518; 372/94

[58] Field of Search ............. 307/514, 515, 518, 516; 356/350; 372/94

[56] References Cited

U.S. PATENT DOCUMENTS

| | | | |
|---|---|---|---|
| 3,715,562 | 2/1973 | Dendy et al. | 356/350 |
| 3,807,866 | 4/1974 | Zingery | 356/350 |
| 4,108,553 | 8/1978 | Zampiello et al. | 356/350 |
| 4,328,463 | 5/1982 | Avins | 307/514 |
| 4,445,779 | 5/1984 | Johnson | 356/350 |
| 4,446,389 | 5/1984 | Williams et al. | 307/516 |

Primary Examiner—Stephen C. Buczinski
Attorney, Agent, or Firm—H. Fredrick Hamann; George A. Montanye; James F. Kirk

[57] ABSTRACT

A laser gyroscope output signal generator for increasing the resolution of the gyroscope includes a first output producing means for producing a plurality of output pulses for each gyroscope produced output pulse when the gyroscope is rotated in a first direction for connection to a down count input of a counter. A second output producing means is also provided for producing a plurality of output pulses for each gyroscope produced output pulse when the gyroscope is rotated in an opposite direction for connection to an up count input of said counter.

6 Claims, 7 Drawing Figures

APPARATUS FOR INCREASING THE RESOLUTION OF A LASER GYROSCOPE

BACKGROUND OF THE INVENTION

1. Field of the Invention

This invention relates to improvements in laser gyroscopes, and more particularly to in circuitry for increasing the resolution of a laser gyroscope.

2. Description of the Prior Art

Laser gyroscopes are known in the art to produce outputs comprised of optical pulses occurring at a rate dependent upon the rate of rotation of the laser gyroscope. Typically, two outputs are developed from a photodiode array which detects the optical frequency difference of clockwise and counterclockwise laser beams within the gyroscope. The photodiode array generates a two phase resolver type signal wherein one signal leads the other or lags the other by 90 degrees, depending upon the input rotation of the gyroscope. One circuit which has been advanced includes a pulse modification circuit for each output line including a preamplifier and squaring trigger together with logic circuitry to produce a first output representing clockwise pulses and a second output representing counterclockwise pulses. In the past, the output pulses produced tracked, one for one, the output pulses of the gyroscope; consequently, the resolution of the entire circuit has been limited by the pulse output frequency developed by the gyroscope.

BRIEF DESCRIPTION OF THE INVENTION

In light of the above, it is, therefore, an object of the invention to provide a circuit for generating output pulses which are multiplied from the pulses developed by the light output of the gyroscope.

It is another object of the invention to provide an output circuit which provides both multiplied output pulses and a direction or sensing signal for use in evaluating the output pulses.

It is yet another object of the invention to provide a laser gyroscope output circuit which generates output pulses which can be applied to up/down counters for interpretation of the gyroscope output.

These and other objects, features and advantages will become apparent to those skilled in the art from the following detailed description when read in conjunction with the accompanying drawings and appended claims.

The invention, in its broad aspect presents a laser gyroscope output signal generator for increasing the resolution of the gyroscope. The signal generator includes a first output producing means for producing a plurality of output pulses for each gyroscope produced output pulse when the gyroscope is rotated in a first direction for connection to a down count input of a counter and a second output producing means for producing a plurality of output pulses for each gyroscope produced output pulse when the gyroscope is rotated in an opposite direction for connection to an up count input of said counter.

BRIEF DESCRIPTION OF THE DRAWING

The invention is illustrated in the accompanying drawing in which.

In the various figures of the drawing, like reference numerals are used to denote like or similar parts.

DETAILED DESCRIPTION OF THE PREFERRED EMBODIMENTS

Figure 1:
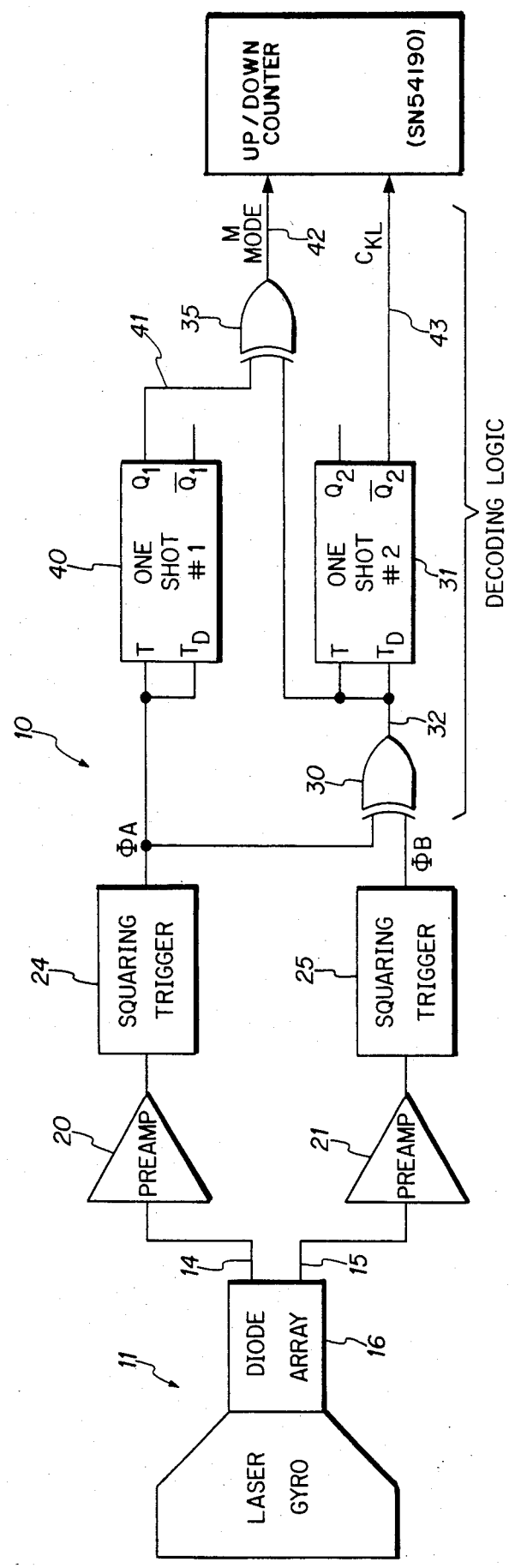
FIG. 1 is a block diagram of a laser gyroscope output signal generator in accordance with a preferred embodiment of the invention.

In accordance with a preferred embodiment of the invention, a laser gyroscope output decoding circuit 10, as shown in FIG. 1, is presented for use in connection with a laser gyroscope 11. The laser gyroscope 11 is of the type commonly employed and known in the art which generates two outputs 14 and 15 from a diode array 16 associated with the gyroscope.

As in the prior art, each of the output lines 14 and 15 has associated with it respective preamplifiers 20 and 21 and squaring triggers 24 and 25. In accordance with the invention, the output, $\phi A$, from the squaring trigger 24, together with the output, $\phi B$, from the squaring trigger 25, are conducted to an exclusive OR gate 30. The output from the exclusive OR gate 30 is conducted to the "T" and "Td" inputs of a one-shot multivibrator 31, as well as to an input of a second exclusive OR gate 35.

The output from the squaring trigger 24 is applied to the "T" and "Td" inputs of a second one-shot multivibrator 40, and the "Q1" output of the second one-shot multivibrator 40 is connected to a second input of the exclusive OR gate 35. The one-shot multivibrators 31 and 40 can conveniently be of the type DM8853, sold by National Semiconductor, Inc.

Thus, two outputs are developed, one being the output from the exclusive OR gate 35, on line 42, which, as described below in detail, represents a mode signal indicative of the direction of rotation of the laser gyroscope 11. The other output is developed on the "not Q2" output of the first one-shot multivibrator 31 on line 43, which represents a clock signal which is a multiplied frequency of either the output developed on line 14 or 15.

Figure 2:
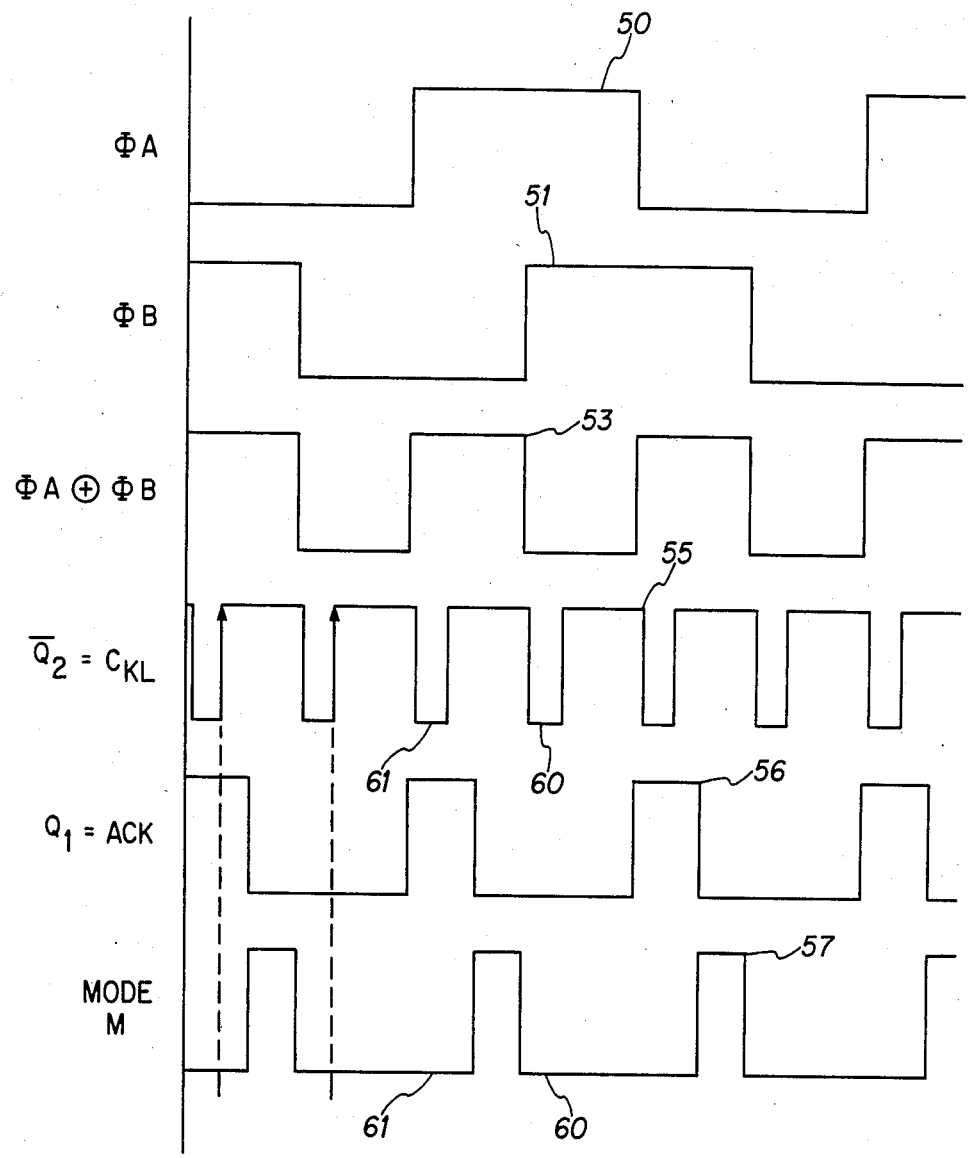
FIG. 2 is a series of wave forms produced at selected points in the circuit of FIG. 1 in which the phase of a first gyroscope output leads the phase of a second gyroscope output.

The operation of the decoding logic circuit 10 will be described with the aid of the wave forms of FIGS. 2 and 3. FIG. 2 illustrates the case where the phase $\phi A$ leads $\phi B$, which could, for instance, result from a clockwise inertial rotation of the laser gyroscope body. The pulse width of the one-shot multivibrator 40 is set to be wider than the pulse width of the one-shot multivibrator 31.

From FIG. 1 it can be seen that the exclusive OR gate 30 generates the exclusive "OR" of $\phi A$ and $\phi B$, resulting in a double frequency signal which changes state at each change of state of $\phi A$ or $\phi B$. This is applied to the bipolar one-shot multivibrator 31, which generates a negative going pulse at "not Q2" for each transition of the signal at "T" and "Td". This is the desired four times clock to be fed to an up/down counter. It should be noted that counters sold by Texas Instruments, Inc., of the type numbered SN54190/191, count up with a negative mode signal at the positive transition of an input clock and can be advantageously employed in conjunction with the circuit described. The negative going output from the multivibrator 31 on signal line 43 is chosen for use as CKL since the up/down counter not shown counts on the positive going edge of the clock, and this has the proper timing relationship to the mode signal. Signal $\phi A$ is applied to the one-shot multivibrator 40 with the output of Q1 being a positive pulse at each transition of $\phi A$. The Q1 signal is exclusive "OR'D" with the output of the exclusive OR gate 30, giving the exclusive "OR" of A(CK), $\phi A$, and $\phi B$. This is the desired mode control. It should be noted that the mode control goes negative at least the clock pulse width of "C(KL)" prior to the positive transition of "C(KL)" and remains negative for a time after the positive transition.

Figure 3:
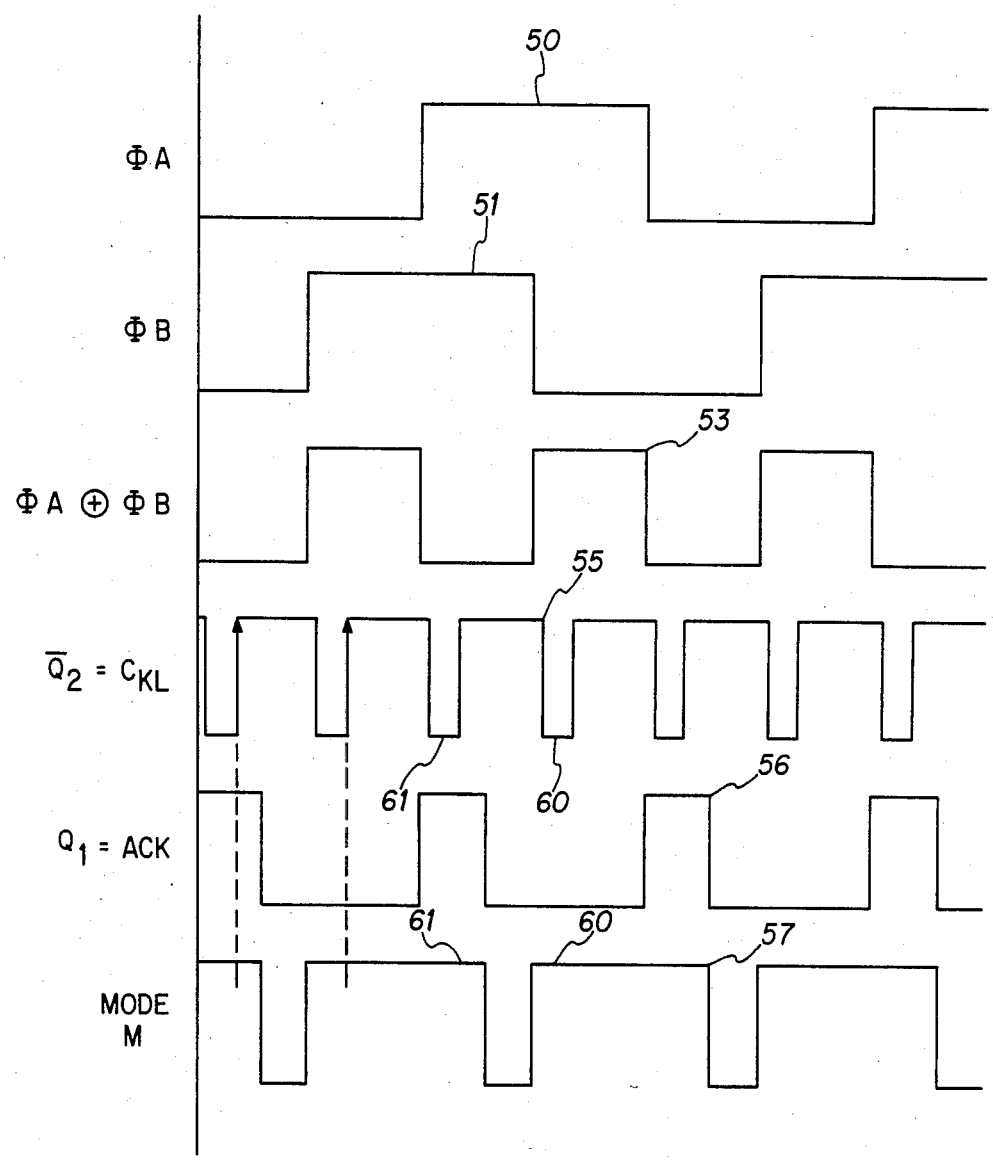
FIG. 3 is a series of aligned wave forms taken at selected points in the circuit of FIG. 1 in which the phase of the first output lags the phase of the second output.

More specifically, in FIG. 3, the output $\phi A$ is denoted by wave form 50 and $\phi B$ is represented by wave form 51. The signal $\phi A$ is developed, for example, on line 14 from the laser gyroscope 11 and the wave form 51 is developed on line 15 at the output of the laser gyroscope 11. Wave form 53 represents the exclusive OR of signal 50 and 51, and represents the output on line 32 from the exclusive OR gate 30.

The output "not Q2" wave form 55 is shown, and represents the output from the one-shot multivibrator 31 developed on line 43. In a similar fashion, the wave form 56 represents the Q1 output of the one-shot multivibrator 40, which is developed on line 41 for application to an input of the exclusive OR gate 35. Finally, the mode signal wave form 57 is generated on line 42 at the output of the exclusive OR gate 35. It should be particularly noted that the portions of the mode wave form 57 immediately adjacent the transitions of the wave form correspond to the negative portions of the clock wave form 55 developed on line 43, as shown by the interconnecting lines 60 and 61. This negative coincidence establishes the mode control for an associated counter, not shown, of the type described, to enable the counter to count up upon application of the clock signal wave form 56, developed on line 43.

In a similar fashion, the wave forms of FIG. 3 are derived at similar locations in the circuit of FIG. 1 as was previously described with respect to FIG. 2, with the exception that signal $\phi A$ lags signal $\phi B$. (The mode wave form 57 in the condition of operation illustrated by the wave forms of FIG. 3, illustrates the point that the wave forms immediately adjacent to the transitions of the wave form 57 are positive at times corresponding to a negative condition of the clock signal "not Q2" developed on line 43.) Thus, when the mode signal wave form 57 is applied to a counter of the type described, the counter counts downwardly to represent a rotation indicating signal of opposite sense from that described with respect to the operation of the gyroscope described with respect to the wave forms of FIG. 3.

Thus, with particular reference to FIG. 3, where $\phi A$ lags $\phi B$, the clock "C(KL)" is generated as for the case where $\phi A$ leads $\phi B$ at four times the signal frequency rate. The positive going clock developed at the output Q1 of the one-shot multivibrator 40 is exclusive OR'D with that of the output of the exclusive OR gate 30, and is positive at each positive transition of the clock "C(KL)" thus causing a counter of the type described to count down. It should be noted that other counters with different polarity mode controls and clock transitions may be accommodated by appropriate use of the Q or "not Q" outputs of the one-shot multivibrators 31 and 40. For example, Q2 output provides a negative trailing edge and "ORING" "not Q1" with the output of the exclusive OR gate 30 reverses the mode control polarity.

Figure 4:
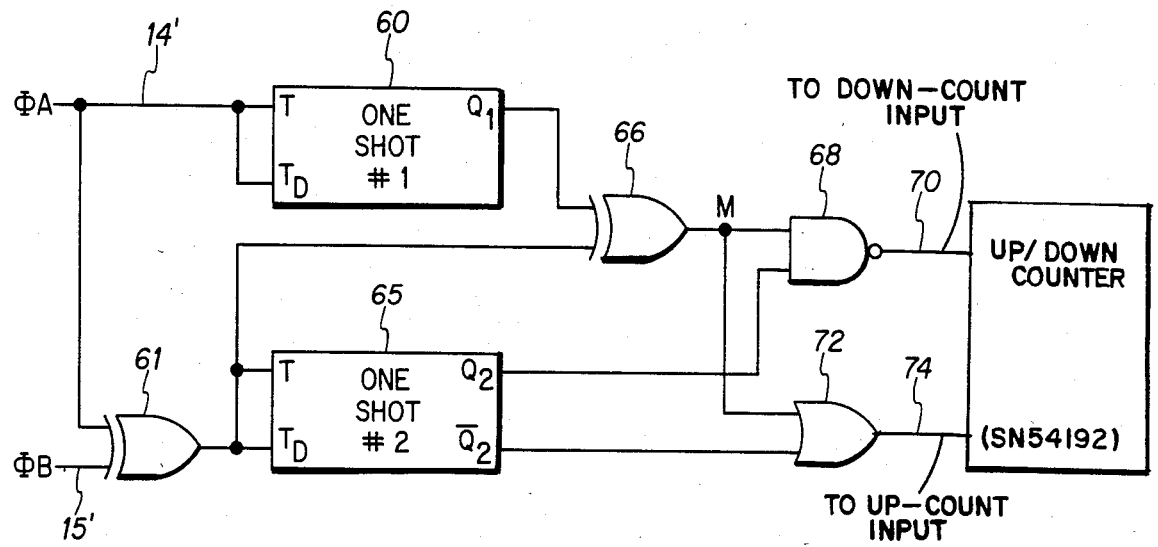
FIG. 4 is an alternative embodiment of the invention showing a circuit for producing separate up and down count outputs.

Other counters, such as those sold by Texas Instruments, Inc., of the type numbered SN54192/193, require separate clock inputs for up and down counting. By adding an "OR gate" and a "NAND" gate, appropriate signals for operating such counters can be generated from a circuit such as that shown on FIG. 4. FIG. 4 circuit includes input lines 14$\alpha$ and 15' which respectively carry signals $\phi A$ and $\phi B$. $\phi A$ is applied via line 14' to the "T" and "Td" inputs of a one-shot multivibrator 60. In addition, the signal $\phi A$ is applied to an input of an exclusive OR gate 61. The signal $\phi B$ is applied to another input of the exclusive OR gate 61, and the output of the exclusive OR gate 61 is applied to the "T" and "Td" inputs of a second one-shot multivibrator 65, as well as to an input of a second exclusive OR gate 66. The output Q1 of the first one-shot multivibrator 60 is applied to another input of the exclusive OR gate 66. The output from the exclusive OR gate 66 is applied to an input of a NAND gate 68. Additionally, the Q2 output of the second one-shot multivibrator 65 is connected to another input of the NAND gate 68. Thus, the output developed on line 70 from the NAND gate 68 is a down count input of multiplied frequency for application to an appropriate counter.

The output from the exclusive OR gate 66 is applied to an input of an OR gate 72. Additionally, the "not Q2" output of the second one-shot multivibrator 65 is applied to another input of the OR gate 72 to produce on line 74 an up count input signal of multiplied frequency from that generated by the gyroscope.

The waveforms of FIG. 2 and FIG. 3 also apply to the circuit of FIG. 4. The output of exclusive OR gate 66 corresponds to the MODE M signal 57 term and the signal from the Q2 output of one-shot multivibrator 65 corresponds to the Q2 waveform signal 55. OR gate 72 provides a low output on line 74 when both inputs are low simultaneously. FIG. 2 shows the Q2 signal 55 to be low during intervals 61 and 60 concurrently with MODE M being low during intervals 61 and 60. OR gate 72 will provide a negative going output pulse during these corresponding intervals at four times the pulse recurrent frequency of waveform 50. NAND gate 68 provides a low output when both inputs are high. NAND gate 68 receives the Q2 (uncomplemented) output of one-shot multivibrator 65. This positive signal is nanded with the positive interval of signal M as in FIG. 3 to provide negative going pulses at four times the pulse recurrent frequency of signal 50.

Figure 5:
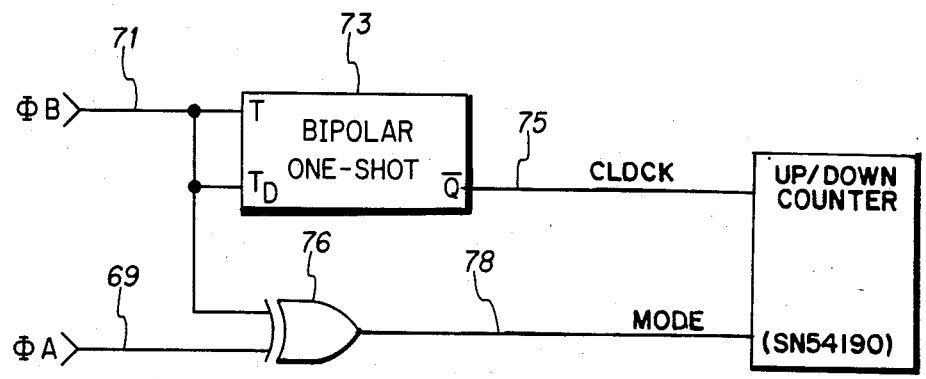
FIG. 5 is an alternative embodiment of the invention for producing two output pulses per each gyroscope produced optical cycle, in accordance with the principles of the invention.

In another aspect of the invention, a circuit to generate two clock pulses per cycle of optical frequency is shown in FIG. 5. As shown, the signals $\phi A$ and $\phi B$ are delivered on lines 69 and 71, respectively. The signal φB is directed to a bipolar one-shot multivibrator 73 and connected to its "T" and "Td" inputs. The output on the "not Q" line 75 represents a clock signal of two times the optical frequency for application to an appropriate counter (not shown).

The φB signal on line 71 is also applied to an input of an exclusive OR gate 76. The φA signal on line 69 is applied to another input of the exclusive OR gate 76 to produce at its output on line 78 a mode signal.

Figure 6:
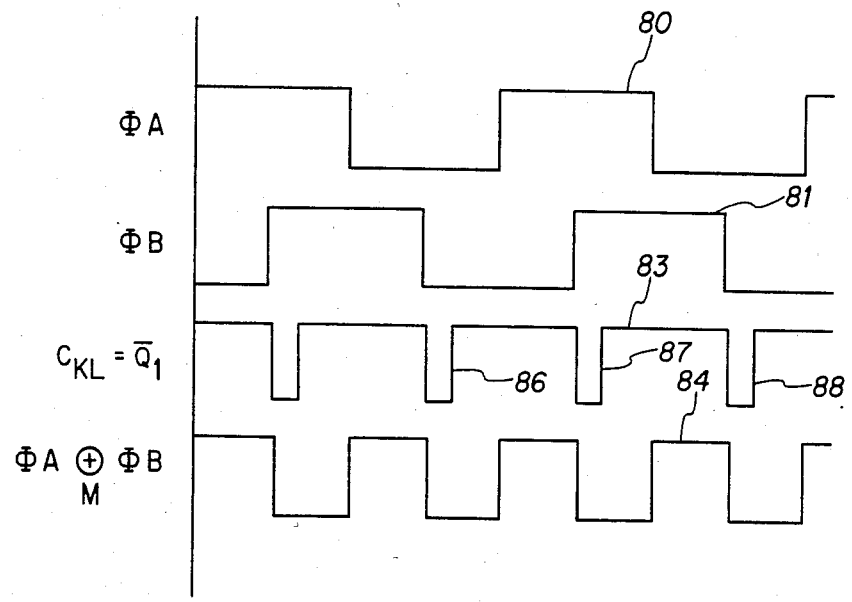
FIG. 6 is a series of aligned wave forms taken at selected points in the circuit of FIG. 5 in which the phase of one output leads the phase of the other.
Figure 7:
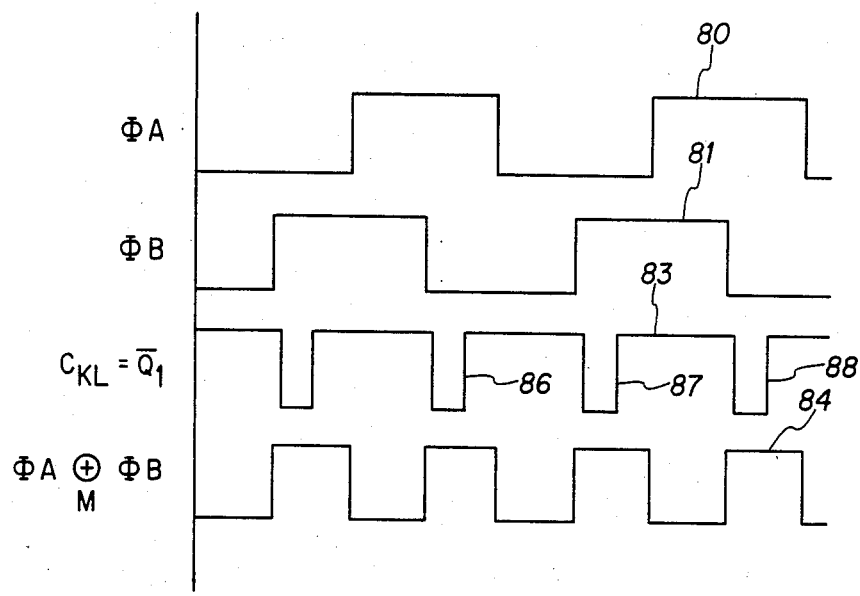
FIG. 7 is a series of aligned wave forms taken at various points in the circuit of FIG. 5 in which the phase of the first output lags the phase of the second.

The wave forms developed by a circuit of FIG. 5 are shown in FIGS. 6 and 7 for wave forms of leading φA and lagging φA, respectively. Thus, as shown in FIG. 6, the wave form 80 representing signal φA leads the wave form 81 representing signal φB. The output at the "not Q" output of the bipolar one-shot multivibrator 73 is shown by wave form 83, and the wave form of the exclusive OR gate 76 developed on line 78 as shown by wave form 84.

It can be seen that during each occurrence of a clock pulse, such as pulses 86, 87 and 88, the mode signal of wave form 84 is negative. Thus, the up/down counters of the type SN54190/191 will count up when such mode signal clock pulse accommodation is applied to it.

On the other hand, in the wave form configuration shown in FIG. 7, the mode signal wave form 84 is positive during the occurrence of each clock pulse. Thus, a counter of the type SN54190/191 with the mode and clock pulse configuration shown will operate the count down.

It can, therefore, be seen that the circuit decoding logic described, in accordance with the invention, provides increased resolution for the output of a laser gyroscope, and, at the same time, presents a concurrent mode signal indicating the sense or direction of rotation of the laser gyroscope with which it is associated.

Although the invention has been described and illustrated with a certain degree of particularity, the present disclosure has been made by way of example only and numerous changes in the combination and arrangement of parts may be resorted to be those skilled in the art without departing from the spirit and scope of the invention as hereinafter claimed.

I claim:

1. A laser gyroscope output signal generator for increasing a laser gyroscope output resolution, said signal generator being responsive to a sequence of pairs of phase shifted first and second laser gyroscope output pulses each being characterized to have a first and second logic state, said first and second output pulses in each pair having a leading or lagging phase relationship determined by the direction of rotation the laser gyroscope sourcing said pairs of phase shifted output pulses said laser gyroscope output signal generator comprising:

a first exclusive OR gate having inputs coupled to respective first and second laser gyroscope output pulses; and, a first one-shot multivibrator having at least one input responsive to any state change at the output of said first exclusive OR gate to produce an output signal having a pulse recurrent frequency of four times that of the first laser gyroscope output pulse; and, a means for generating an up/down counter mode control output signal having;

a second one-shot multivibrator having at least one input responsive to any state change of the first gyroscope output pulse to produce an output, and a second exclusive OR gate having a first input coupled to the output of said one-shot multivibrator and a second input coupled to the output of said first exclusive OR gate the output of said second exclusive OR gate providing said up/down counter mode control output signal; and, a counter having a clock input responsive to the output signal of said first multivibrator and an up/down mode control input responsive to the up/down mode control output signal of said second exclusive OR gate for counting up in response to the change of state of said clock signal with said up/down mode control output signal being in a first logic state and for counting down in response to the change of state of said clock signal with said up/down mode control output signal being in a second logic state;

whereby, each pair of laser gyroscope first and second output pulses increments the count in said counter to characterize the rotation of said laser gyroscope.

2. The laser gyroscope of claim 1 further comprising:

a first preamplifier and a first squaring trigger to which said first output of said laser gyroscope is applied to generate said laser gyroscope first output pulse for appliction to said first exclusive OR gate and said second one-shot multivibrator and a second preamplifier and a second squaring trigger to which said second output of said gyroscope is applied to generate said laser gyroscope second output pulse for application to said first exclusive OR gate.

3. The laser gyroscope output signal generator of claim 1 wherein said first one-shot multivibrator is characterized to have an output pulse width longer in duration than the output pulse width of the second one-shot multivibrator.

4. A laser gyroscope output signal generator responsive to first and second laser gyroscope output pulses for increasing the resolution of the gyroscope, comprising:

A first output producing means for producing a plurality of output pulses for each gyroscope produced output pulse when the gyroscope is rotated in a first direction for connection to a down count input of a counter;

and a second output producing means for producing a plurality of output pulses for each gyroscope produced output pulse when the gyroscope is rotated in an opposite direction for connection to an up-count input of said counter, said first and second output producing means having, a first exclusive OR gate having inputs connected to receive said first gyroscope output pulse and a second gyroscope output pulse, a first one-shot multivibrator having at least one input connected to receive the output from said first exclusive OR gate to produce an output upon the occurrence of any state change, a second one-shot multivibrator having at least one input connected to receive output pulses from said first output of said gyroscope to produce an output upon the occurrence of any state change, a second exclusive OR gate having inputs connected to receive the output from said second one-shot multivibrator and from said first exclusive OR gate, a NAND gate having inputs connected to receive the outputs from said second exclusive OR gate and from said first one-shot multivibrator to produce a down-count output having a pulse recurrent frequency of four times that of the first laser gyroscope output pulse for application to said down-count input of said counter, and an OR gate having inputs connected to receive outputs from said second exclusive OR gate and an inverted output from said first one-shot multivibrator to produce an up-count output having a pulse recurrent frequency of four times that of the first laser gyroscope output pulse for application to said up-count input of said counter;

whereby, said counter is counted up as said laser gyroscope is rotated in said first direction and said counter is counted down as said laser gyroscope is rotated in the opposite direction.

5. The laser gyroscope output signal generator of claim 4 wherein said first one-shot multivibrator is characterized to have an output pulse width longer in duration than the output pulse width of the second one-shot multivibrator.

6. A laser gyroscope output signal generator for increasing a laser gyroscope output resolution, said signal generator being responsive to a sequence of pairs of phase shifted first and second laser gyroscope output pulses each being characterized to have a first and second logic state, said first and second output pulses in each pair having a leading or lagging phase relationship determined by the direction of rotation the laser gyroscope sourcing said pairs of phase shifted output pulses said laser gyroscope output signal generator comprising:

an exclusive OR gate having inputs coupled to respective first and second laser gyroscope output pulses for providing an up/down mode control signal at an output, a one-shot multivibrator having at least one input responsive to any state change at the output of said first laser gyroscope output pulse to produce an output signal having a pulse recurrece frequency of two times that of the first laser gyroscope output pulse and, a counter having a clock input coupled to the output signal of said multivibrator and an up/down mode control input coupled to the up/down mode control output signal of said first exclusive OR gate for counting up in response to a change of state of said clock signal with said up/down mode control output signal being in a first logic state and for counting down in response to the change of state of said clock signal with said up/down mode control output signal being in a second logic state;

whereby, each pair of laser gyroscope first and second output pulses increments the count in said counter twice to characterize the rotation of said laser gyroscope with increased resolution.

* * * * *